United States Patent [19]

Pisello et al.

[11] Patent Number: 5,495,607
[45] Date of Patent: Feb. 27, 1996

[54] NETWORK MANAGEMENT SYSTEM HAVING VIRTUAL CATALOG OVERVIEW OF FILES DISTRIBUTIVELY STORED ACROSS NETWORK DOMAIN

[75] Inventors: Thomas Pisello, De Bary; David Crossmier, Casselberry; Paul Ashton, Oviedo, all of Fla.

[73] Assignee: Conner Peripherals, Inc., San Jose, Calif.

[21] Appl. No.: 153,011

[22] Filed: Nov. 15, 1993

[51] Int. Cl.$^6$ .......................... G06F 11/30; G06F 13/00; G06F 15/16

[52] U.S. Cl. .................. 395/600; 395/200.01; 395/650; 395/800; 395/280; 395/180; 364/229.5; 364/242.96; 364/DIG. 1; 364/974.2; 364/DIG. 2

[58] Field of Search ........................... 364/200; 395/200, 395/600, 650, 325, 575

[56] References Cited

U.S. PATENT DOCUMENTS

| | | | |
|---|---|---|---|
| 4,141,006 | 2/1979 | Braxton | 379/40 |
| 4,710,870 | 12/1987 | Blackwell et al. | 395/575 |
| 4,805,134 | 2/1989 | Calo et al. | 395/600 |
| 4,897,841 | 6/1990 | Gang, Jr. | 370/85.13 |
| 4,914,571 | 4/1990 | Baratz et al. | 395/600 |
| 4,987,531 | 1/1991 | Nishikado et al. | 395/600 |
| 5,001,628 | 3/1991 | Johnson et al. | 395/600 |
| 5,077,658 | 12/1991 | Bendert et al. | 395/600 |
| 5,133,075 | 7/1992 | Risch | 395/800 |
| 5,163,131 | 11/1992 | Row et al. | 395/200 |
| 5,175,852 | 12/1992 | Johnson et al. | 395/600 |
| 5,216,591 | 6/1993 | Nemirovsky et al. | 395/200 |
| 5,220,562 | 6/1993 | Takada et al. | 370/85.13 |
| 5,247,670 | 9/1993 | Matsunaga | 395/650 |
| 5,271,007 | 12/1993 | Kurahashi et al. | 395/600 |
| 5,287,453 | 2/1994 | Roberts | 395/200 |
| 5,287,461 | 2/1994 | Moore | 395/275 |
| 5,295,244 | 3/9194 | Deu et al. | 395/200 |
| 5,325,527 | 6/1994 | Cwikowski et al. | 395/650 |

OTHER PUBLICATIONS

Sudhaka et al., "Design and performance evaluation considerations of multimedia medical database". IEEE, Oct. 1993, pp. 888–894.

Robinson et al. "Domain: a New approach to distributed system management", IEEE, 1988, 154–163.

News clip regarding "File Wizard" product.
News clip regarding "LAN Auditor 3.0" product.

*Primary Examiner*—Thomas G. Black
*Assistant Examiner*—Cuan Pham
*Attorney, Agent, or Firm*—Fliesler, Dubb, Meyer & Lovejoy

[57] ABSTRACT

A network management system includes a domain administrating server (DAS) that stores a virtual catalog representing an overview of all files distributively stored across a network domain currently or in the past. The current and historical file information is used for assisting in auditing or locating files located anywhere in the domain. The current file information is used for assisting in transferring files across the domain. The domain administrating server (DAS) also includes a rule-base driven artificial administrator for monitoring and reacting to domain-wide alert reports and for detecting problematic trends in domain-wide performance based on information collected from the network domain.

23 Claims, 4 Drawing Sheets

NETWORK MANAGEMENT SYSTEM HAVING VIRTUAL CATALOG OVERVIEW OF FILES DISTRIBUTIVELY STORED ACROSS NETWORK DOMAIN

BACKGROUND

1. Field of the Invention

The invention relates generally to the field of computerized networks. The invention relates more specifically to the problem of managing a system having a variety of file storage and file serving units interconnected by a network.

2. Cross Reference to Related Applications

The following copending U.S. patent application(s) is/are assigned to the assignee of the present application, is/are related to the present application and its/their disclosures is/are incorporated herein by reference:

(A) Ser. No. 08/151,525 [Attorney Docket No. CONN8675] filed Nov. 12, 1993 by Guy A. Carbonneau et al and entitled, SCSI-COUPLED MODULE FOR MONITORING AND CONTROLLING SCSI-COUPLEDHAID BANK AND BANK ENVIRONMENT;

3. Description of the Related Art

Not too long ago, mainframe computers were the primary means used for maintaining large databases. More recently, database storage strategies have begun to shift away from having one large mainframe computer coupled to an array of a few, large disk units or a few, bulk tape units, and have instead shifted in favor of having many desktop or mini- or micro-computers intercoupled by a network to one another and to many small, inexpensive and modularly interchangeable data storage devices (e.g., to an array of small, inexpensive, magnetic storage disk and tape drives).

One of the reasons behind this trend is a growing desire in the industry to maintain at least partial system functionality even in the event of a failure in a particular system component. If one of the numerous mini/micro-computers fails, the others can continue to function. If one of the numerous data storage devices fails, the others can continue to provide data access. Also increases in data storage capacity can be economically provided in small increments as the need for increased capacity develops.

A common configuration includes a so-called "client/ server computer" that is provided at a local network site and has one end coupled to a local area network (LAN) or a wide area network (WAN) and a second end coupled to a local bank of data storage devices (e.g., magnetic or optical, disk or tape drives). Local and remote users (clients) send requests over the network (LAN/WAN) to the client/server computer for read and/or write access to various data files contained in the local bank of storage devices. The client/ server computer services each request on a time shared basis.

In addition to performing its client servicing tasks, the client/server computer also typically attends to mundane storage-management tasks such as keeping track of the amount of memory space that is used or free in each of its local storage devices, maintaining a local directory in each local storage device that allows quick access to the files stored in that local storage device, minimizing file fragmentation across various tracks of local disk drives in order to minimize seek time, monitoring the operational status of each local storage device, and taking corrective action, or at least activating an alarm, when a problem develops at its local network site.

Networked storage systems tend to grow like wild vines, spreading their tentacles from site to site as opportunities present themselves. After a while, a complex mesh develops, with all sorts of different configurations of client/server computers and local data storage banks evolving at each network site. The administration of such a complex mesh becomes a problem.

In the early years of network management, a human administrator was appointed for each site to oversee the local configuration of the on-site client/server computer or computers and of the on-site data storage devices.

In particular, the human administrator was responsible for developing directory view-and-search software for viewing the directory or catalog of each on-site data storage device and for assisting users in searches for data contained in on-site files.

The human administrator was also responsible for maintaining backup copies of each user's files and of system-shared files on a day-to-day basis.

Also, as primary storage capacity filled up with old files, the human administrator was asked to review file utilization history and to migrate files that had not been accessed for some time (e.g., in the last 3 months) to secondary storage. Typically, this meant moving files that had not been accessed for some time, from a set of relatively-costly high-speed magnetic disk drives to a set of less-costly slower-speed disk drives or to even slower, but more cost-efficient sequential-access tape drives. Very old files that lay unused for very long time periods (e.g., more than a year) on a "mounted" tape (which tape is one that is currently installed in a tape drive) were transferred to unmounted tapes or floppy disks and these were held nearby for remounting only when actually needed.

When physical on-site space filled to capacity for demounted tapes and disks, the lesser-used ones of these were "archived" by moving them to more distant physical storage sites. The human administrator was responsible for keeping track of where in the migration path each file was located. Time to access the data of a particular file depended on how well organized the human administrator was in keeping track of the location of each file and how far down the chain from primary storage to archived storage, each file had moved.

The human administrator at each network site was also responsible for maintaining the physical infrastructure and integrity of the system. This task included: making sure power supplies were operating properly, equipment rooms were properly ventilated, cables were tightly connected, and so forth.

The human administrator was additionally responsible for local asset management. This task included: keeping track of the numbers and performance capabilities of each client/ server computer and its corresponding set of data storage devices, keeping track of how full each data storage device was, adding more primary, secondary or backup/archive storage capacity to the local site as warranted by system needs, keeping track of problems developing in each device, and fixing or replacing problematic equipment before problems became too severe.

With time, many of the manual tasks performed by each on-site human administrator came to be replaced, one at a time on a task-specific basis, by on-site software programs. A first set of one or more, on-site software programs would take care of directory view-and-search problems for files stored in the local primary storage. A second, independent set of one or more, on-site software programs would take care of directory view-and-search problems for files stored in the local secondary or backup storage. Another set of one or more, on-site software programs would take care of making routine backup copies and/or routinely migrating older files down the local storage migration hierarchy (from primary storage down to archived storage). Yet another set of on-site software programs would assist in locating files that have been archived. Still another set of independent, on-site software programs would oversee the task of maintaining the physical infrastructure and integrity of the on-site system. And a further set of independent, on-site software programs would oversee the task of local asset management.

The term "task-segregation" is used herein to refer to the way in which each of the manual tasks described above has been replaced, one at a time by a task-specific software program.

At the same time that manual tasks were being replaced with task-segregated software programs, another trend evolved in the industry where the burden of system administration was slowly shifted from a loose scattering of many local-site, human administrators ——one for each site—— to a more centralized form where one or a few human administrators oversee a large portion if not the entirety of the network from a remote site.

This evolutionary movement from local to centralized administration, and from task-segregated manual operation to task-segregated automated operation is disadvantageous when viewed from the vantage point of network-wide administration. The term "network-wide administration" is used here to refer to administrative tasks which a human administrator located at a central control site may wish to carry out for one or more client/server data storage systems located at remote sites of a large network.

A first major problem arises from the inconsistency among user interfaces that develops across the network. In the past, each local-site administrator had a tendency to develop a unique style for carrying out man-to-machine interactions. As a result, one site might have its administrative programs set up to run through a graphical-user interface based on, for example the Microsoft Windows™ operating environment, while another site might have its administrative programs running through a command-line style interface based on, for example the Microsoft DOS 6.0™ operating system or the AT&T UNIX™ operating system. A network-wide administrator has to become familiar with the user interface at each site and has to remember which is being used at each particular site in order to be able to effectively communicate with the local system administrating software programs. Inconsistencies among the interfaces of multiple network sites makes this a difficult task.

Another problem comes about from the task-segregated manner in which local administrative programs have developed over the years. A remote human administrator (or other user) has to become familiar with the local topology of each network site when searching for desired files. In other words, he or she has to know what kinds of primary, secondary, backup and archive storage mechanism are used at each site, how they are connected, how data files migrate through them, and which "file manager" program is to be used to view the files of each type of storage mechanism.

More specifically, if a file cannot be found in the directory of a primary storage device located at a particular network site, the administrator has to switch from the primary storage viewing program to a separate, migration-tracking program to see if perhaps the missing file has been migrated to secondary or archive storage at that site. The administrator may have to switch to a separate, backup-tracking program to see if a file that is missing from primary and secondary storage might be salvaged out of backup storage at the same or perhaps a different site. Sometimes, the administrator may wish to see a historical profile of a file in which revisions have been made to the file over a specified time period. A separate file-history tracking program at the site might have to be consulted, if it exists at all, to view such a historical profile.

If a file cannot be found at a first site then perhaps a copy might be stored at another site. To find out if this is the case, the administrator has to log out of the first site, log-in to the system at a next site and repeat the above process until the sought after data is located or the search is terminated.

Each switch from one site to a next, and from one independent file-managing program to another disadvantageously consumes time and also introduces the problem of inconsistent user interfaces.

A similar set of problems is encountered in the overseeing of lower-level infrastructure support operations of a networked data storage system. Included in this category are the scheduling and initiation of routine file backup and file migration operations at each site, the tracking of problems at each site and so forth.

A method and system for integrating all the various facets of system administration on a network-wide basis is needed.

SUMMARY OF THE INVENTION

The invention overcomes the above-mentioned problems by providing a network management system having virtual catalog overview function for viewing of files distributively stored across a network domain.

A network management system in accordance with the invention comprises: (a) a domain administrating server (DAS) coupled to a network-linking backbone of a network domain for scanning the network domain to retrieve or broadcast domain-wide information, where the domain administrating server (DAS) has means for storing and maintaining a domain-wide virtual catalog and for overseeing other domain-wide activities, and where the domain-wide virtual catalog contains file identifying information for plural files distributively stored in two or more file servers of the network domain; and (b) one or more workstations, coupled by way of the network-linking backbone to the domain administrating server for accessing the domain-wide information retrieved by the domain administrating server.

A method in accordance with the invention comprises the steps of: (a) interrogating the local catalog of each data storage device in a network composed of plural data storage devices linked to one another by a network-linking backbone, (b) retrieving from each interrogated local catalog, file identifying information identifying a name, a storage location and/or other attributes of each file stored in the interrogated device; and (c) integrating the retrieved file identifying information collected from each local catalog into a domain-wide virtual catalog so that each file stored on the network can be identified by name, location an/or another attribute by consulting the domain-wide virtual catalog.

BRIEF DESCRIPTION OF THE DRAWINGS

The below detailed description makes reference to the accompanying drawings, in which.

DETAILED DESCRIPTION

Figure 1:
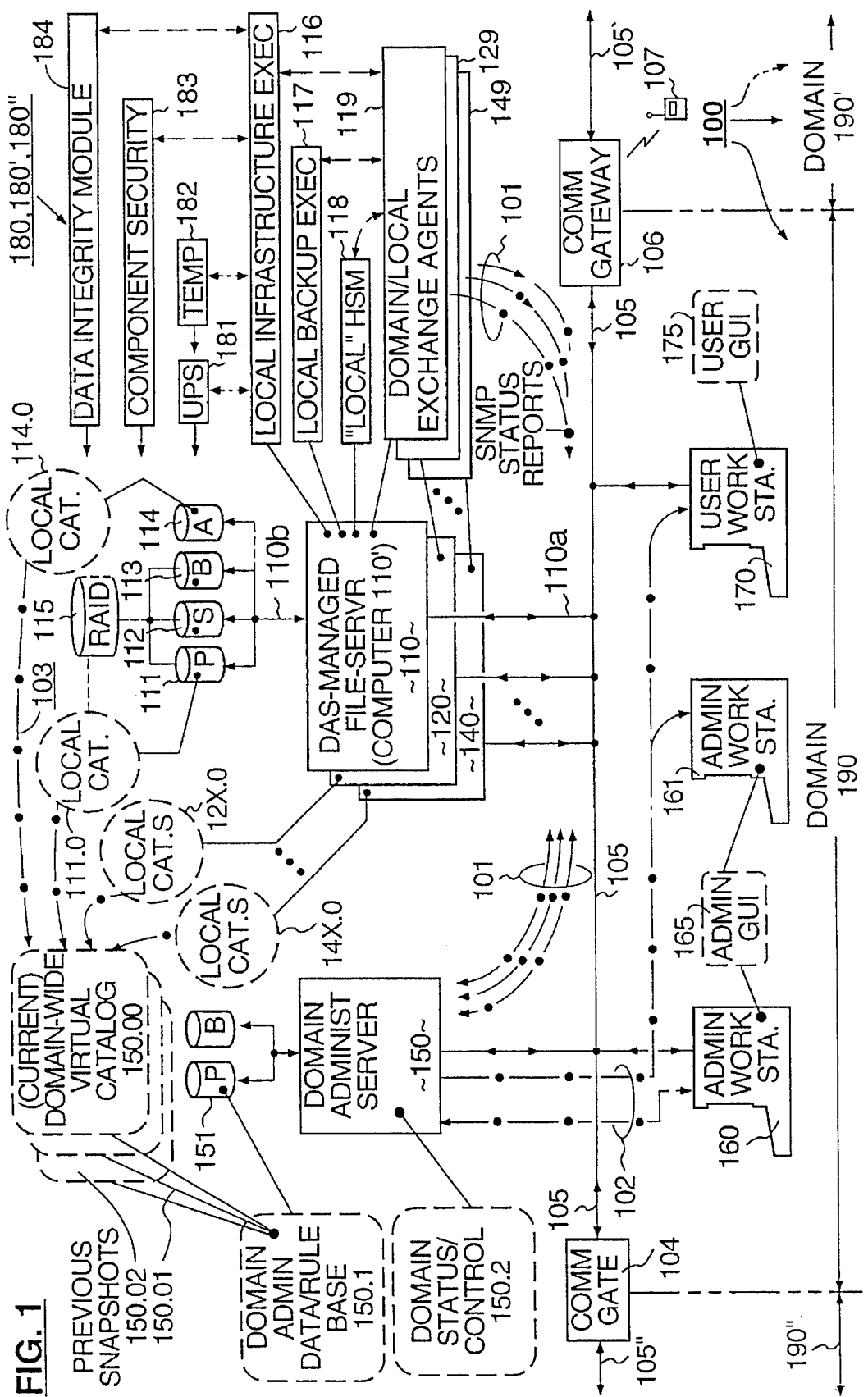
FIG. 1 is a block diagram showing a centralized domain management system in accordance with the invention.

FIG. 1 is a block diagram of a networked enterprise system 100 in accordance with the invention.

Major components of the networked enterprise system 100 include: a network-linking backbone 105, a plurality of DAS-managed file-servers 110, 120, . . . , 140, operatively coupled to the backbone 105; and a domain administrating server (DAS) 150 also operatively coupled to the backbone 105.

The network-linking backbone 105 can be of any standard type used for forming local-area or wide-area digital data networks (or even metropolitan wide networks). Examples of standard backbones include Ethernet coaxial or twisted pair cables and token ring systems.

One or more communication gateways 104, 106 can link the illustrated backbone 105 to additional backbones 105', 105". The communications gateways 104, 106 may be of the wired type (e.g., high-speed digital telephone lines) or a wireless type (e.g. microwave or satellite links). As such the overall communications network -105"-104-105-106-105'- etc., can extend over long distances and pass through many geographic sites. Examples include communication networks which interlink different offices of a large building complex, or those which interlink multiple buildings of a campus, or those which interlink campuses of different cities or those that interlink transcontinental or global sites.

For purposes of administration, it is convenient to call the overall communications network -105"-104-105-106-105'- etc., and the resources connected to it, an "enterprise". It is convenient to subdivide the enterprise into a plurality of nonoverlapping "domains". The domains are logical subdivisions but may follow physical subdivisions. Examples of such subdivisions include but are not limited to: (a) subdividing a building-wide enterprise into floor-wide domains, one for each floor; (b) subdividing a corporate-wide enterprise into department-wide domains, one for each department of the corporate structure (e.g., accounting, marketing, engineering, etc.); (c) subdividing a multi-city enterprise according to the different cities it services; and so forth.

A block diagram of a first domain 190 within an enterprise system 100 in accordance with the invention is shown in FIG. 1. The enterprise system 100 can be composed of the one illustrated domain 190 or may have a plurality of like-structured or differently-structured domains connected to the illustrated first domain 190.

The aforementioned network-linking backbone 105 and plural file servers 110, 120, . . . , 140 are included within the first domain 190. The domain administrating server (DAS) 150 is also included within the first domain 190 as are a plurality of administrative workstations 160, 161, etc., and a plurality of user workstations 170, 171 (not shown), etc., which also connect to the network-linking backbone 105.

Although not shown, it is to be understood that numerous other data input and/or output devices can be connected to the network-linking backbone 105, including but not limited to: so-called "dumb" terminals which do not have a nonvolatile mass storage means of their own, printers, labelmakers, graphical plotters, modems, data acquisition equipment (analog-to-digital converters), digital voice and/or image processing equipment, and so forth. File-servers 110, 120, . . . , 140 may be used for storing or outputting the data created or used by these other data input and/or output devices.

Each file server 110, 120, . . . , 140 has associated with it: (1) a respective, local server computer 110', 120', . . . , 140'; (2) a set of one or more nonvolatile data storage devices (e.g. 111–114); and (3) a respective infrastructure 180, 180', . . ., 180" for supporting operations of the local server computer (e.g., 110') and its associated data storage devices (e.g. 111–114).

It is to be understood that communications gateway 106 can be used to link the first domain 190 to a variety of other structures, including a subsequent and like-structured second domain 190'. Similarly, communications gateway 104 can be used to link the first domain 190 to a variety of other structures, including a preceding and like-structured third domain 190". Data can be transferred from one domain to the next via the communications gateways 104, 106.

In addition to being able to communicate with other domains, each communications gateway 104, 106 can link via telephone modem or by way of a radio link to remote devices such as an administrator's home computer or an administrator's wireless pager (beeper) 107 and send or receive messages by that pathway.

The internal structure of the first of the DAS-managed file servers, 110, is now described as exemplary of the internal structures of the other DAS-managed file servers, 120, . . ., 140. The term "DAS-managed" indicates, as should be apparent by now, that each of file servers 110, 120, . . . , 140 is somehow overseen or managed by the Domain Administrating Server (DAS) 150. Details of the oversight and/or management operations are given below.

The first DAS-managed file server 110 includes a client/server type of computer 110' which is represented by box 110 and referred to herein as the "local server computer 110'". Server computer 110' is understood to include a CPU (central processing unit) that is operatively coupled to internal RAM (random access memory) and/or ROM (read-only memory). Examples of client/server type computers that form the foundation for server computer 110' include off-the shelf tower-style computers that are based on the Intel 80486™ microprocessor and come bundled with appropriate client/server supporting hardware and software.

The local server computer 110' of the first DAS-managed file-server 110 has a network interface port 110a that operatively couples the server computer 110' to the network-linking backbone 105 and a mass-storage port 110b that operatively couples the server computer 110' to one or more of: a primary mass storage means 111, a slower secondary storage means 112, a backup storage means 113, and an archived-data storage and retrieval means 114.

The primary storage means 111 can be a high speed Winchester-type magnetic disk drive or the like but can also include battery-backed RAM disk and/or non-volatile flash-EEPROM disk or other forms of high-performance, nonvolatile mass storage.

The secondary storage means 112, if present, can include a slower WORM-style optical storage drive (Write Once, Read Many times) or a "floptical" storage drive or other secondary storage devices as the term will be understood by those skilled in the art. (Secondary storage is generally understood to cover mass storage devices that have somewhat slower access times than the associated primary storage but provide a savings in terms of the cost per stored bit.)

The backup storage means 113 can include magnetic disk drives but more preferably comprises DAT (Digital Audio Tape) drives or other forms of tape drives or other cost-efficient backup storage devices. A backup copy of each file held in primary or secondary storage (111, 112) is preferably made on a periodic basis (e.g., nightly or every weekend) so that a relatively recent copy of a given file can be retrieved even in the case where the corresponding primary or secondary storage means (111, 112) suffers catastrophic failure; e.g., a head crash or destruction.

The archived-data storage and retrieval means 114 typically comes in the form of an archive create/-retrieve drive and an associated set of removable tapes or removable disk cartridges. Most if not all of the associated set of removable archive tapes and/or removable archive disk cartridges are not physically mounted to the archive create/retrieve drive (as indicated by the dashed connection line) and are thus not immediately accessible to the server computer 110'. They can be mounted when requested and thereafter accessed.

Note: The above description is intended to be generic of the types of nonvolatile mass storage means 111–114 that might be connected to the mass-storage port 110b of the server computer 110'. In theory, each server computer can have all of the primary (P), secondary (S), backup (B) and archive (A) storage means (111–114) connected to its mass-storage port 110b. Due to cost and performance considerations however, a typical set-up will instead have one or more "groups" of server computers to which primary but not secondary storage means is connected. Each such server computer will be referred to as a primary file server. A second set of server computers will have secondary but not primary storage means connected to them and will be each referred to as a secondary or "HSM" file server and will each service a particular "group" of primary file servers. A secondary file server is sometimes also referred to as a "storage server".

Backup storage means (e.g., a tape cartridge drive) may be provided either on a one-for-one basis for each server computer or one server computer might be dedicated for generating backup tapes/disks for a pre-assigned group of primary and/or secondary file servers.

Archive storage can be similarly configured on a one-for-one basis for each server computer or one server computer might be dedicated for creating and retrieving archive tapes/disks for an associated group of primary and/or secondary file servers.

The data files of the primary, secondary and backup storage means 111–113 can be organized conventionally or distributed redundantly across a plurality of drives in accordance with a practice known as RAID (Redundant Array of Inexpensive Data-storage drives). A detailed description of the intricacies involved in managing a RAID system may be found in the above-cited patent application, SCSI-COUPLED MODULE FOR MONITORING AND CONTROLLING SCSI-COUPLED RAID BANK-AND-BANK ENVIRONMENT, which application is incorporated herein by reference. As such these will not be detailed here. In brief, each file is distributively stored across two or more storage drives so that failure of a single drive will not interfere with the accessibility or integrity of a stored file. The dashed symbol 115 for a RAID bank indicates the possibility of file distribution across redundant drives.

The above-cited application also details the intricacies involved in maintaining an infrastructure 180 for supporting various operations of the data storage devices 111–113 of a given server computer, and as such these will not be detailed here either. In brief, the infrastructure 180 of the server computer 110' preferably includes an uninterruptible power supply means (UPS) 181 for supplying operational power to the local data storage devices 111–113 and to the local server computer 110'. A local temperature control means 182 (e.g. cooling fans) may be included in the infrastructure 180 for controlling the temperatures of the local devices 110', 111–113. A local component security means 183 (e.g. a locked, alarmed cabinet) may be provided for assuring physical security of one or more of the local components 110', 111–113 (and also, if desired, of the archived-data storage means and tapes 114). A local data path integrity checking module 184 may be further included within the local infrastructure 180 for assuring proper interconnections by cable or otherwise between units 110' and 111–113 so that data is properly transferred from one to the other.

A local infrastructure support program 116 is preferably loaded into the local server computer 110' for monitoring and managing one or more of the local infrastructure components 181–184 coupled to it and its associated data storage units 111–114.

A local backup execution program 117 is also preferably installed in the local server computer 110' for routinely making, or at least requesting, backups of various data files held in the local primary and secondary storage means 111–112. (Aside: As will be understood from the below discussion, a disadvantageous traffic congestion condition may develop on the network-linking backbone 105 as a result of many primary file servers all trying to backup their files at one time to a shared backup server. To avoid this, backup making is preferably controlled on a domain-wide basis by a backup-scheduler and policy-enforcer which is contained in the box numbered 150.2 and which will be described in more detail below. The local backup execution program 117 sends requests to the backup scheduler/policy enforcer and receives execution commands or permissions from the scheduler/policy enforcer 150.2. These backup commands/permissions are issued on the basis of a rule base 150.1 that tries to minimize traffic congestion and balance workloads along network-linking backbone 105 by appropriate scheduling.)

A "local" hierarchal storage migration (HSM) control program 118 may also be installed in the local server computer 110' for managing the migration of less-often used files from primary storage 111 to secondary storage 112. As explained above, a typical set-up will have one dedicated, HSM file server providing migration services to a designated "group" of primary file servers. Domain 190 can have plural, nonoverlapping "groups" of primary file servers and in such a case, each group will have its own dedicated, HSM file server. When dedicated HSM file servers are used, the hierarchal storage migration (HSM) control program 118 will typically reside only inside the dedicated HSM file servers. (As will be understood from the below discussion, if two HSM servers try to perform their migration operations at the same time, it is possible that such operations will lead to excessive traffic congestion on the shared network-linking backbone 105. As such, migration of files between primary and secondary storage is preferably controlled on a domain-wide basis by a migration-scheduler and policy-enforcer which is contained in the box numbered 150.2 and which will be described in more detail below. The local hierarchical storage migration control program 118 sends requests to the migration scheduler/policy enforcer and receives execution commands or permissions from the scheduler/policy enforcer 150.2. These migration commands/permissions are issued on the basis of a rule base 150.1 that tries to minimize traffic congestion and balance workloads along network-linking backbone 105 by appropriate scheduling.)

A plurality of domain/local exchange agent programs 119 are also preferably loaded in the server computer 110' for cooperatively interacting with the domain administrating server 150 as will be explained shortly. Note that a filled circle, with a line extending from it to a corresponding software structure, is used to indicate that the software structure is installed on the particular server computer.

Each of the primary (P), secondary (S), backup (B) and archive (A) storage means 111–114 has a local catalog defined within it for identifying the name, location and other attributes of each file stored therein. The local catalog will also typically store information describing each directory full of files or full of subdirectories that is defined therein, and each volume full of directories that is defined therein.

The file-locating information in the local catalog may include a name (ServerName) given to the associated server computer. The file-locating information may also include a set of partition definitions: (a) for partitioning the physical storage media of a given server computer into a set of logical "volumes", (b) for assigning a unique name (VolumeName) to each volume, (c) for indicating the number of files (VolumeFileCount) stored in each volume, (d) for indicating the total storage capacity (VolumeSizeInBytes) of the volume, the amount of used space (VolumeActiveBytes), and the amount of free space (VolumeInactiveBytes).

Volumes are typically subdivided logically into a root directory and a plurality of subdirectories. The file-locating information in the local catalog will usually include a name (DirectoryName) given to each such subdivision and a count of the number of included files (FileCount).

Because each directory can be logically subdivided into subdirectories wherein a desired file might be found, the file-locating information in the local catalog will usually define a "pathname" for uniquely identifying each file according to the path followed from a root point to the subdirectory that holds the file. A typical pathname has it branches separated by the backslash symbol ("\") and takes on the form:

Path=:ServerName\VolumeName\RootDirectory\-Subdirectory\Subdirectory\ . . . \Subdirectory\FileName The first item in the pathname is the name of the physical server computer that controls the storage drive or drives in which the file is located. The second item is a logical volume name assigned to a logical partition of the local storage means. For Microsoft DOS™ based machines, the volume names of hard drive partitions typically take on a name such as C:, D:, E:, and so forth. The remaining items in the pathname define a path through directories and subdirectories as will be understood by those skilled in the art. The last item is the name of the file being sought.

Aside from storage location and FileName the other attributes indicated in the local catalog may include but are not limited to: (1) File Size (e.g. in number of bytes); (2) File Chronology in terms of Creation date and time, latest Modify or revision date and time, latest read-only Access date and time, and latest Archive date and time; (3) File User information in terms of who is the "Owner" or original creator of the file, who was the LastModifier of the file, who has read/write/execute permission for this file, and so forth.

Yet further attributes may link the particular file to other data structures and provide system-level control and indicator bits such as the following list of Novell-defined attributes: System, ReadOnly, ExecuteOnly, Subdirectory, Archive, Shareable, Compress, Salvageable, Purgeable, Migrated, Indexed, ReadAudit, WriteAudit, ImmediatePurge, RenameInhibit, DeleteInhibit, CopyInhibit, ImmediateCompress, CompressInhibit and Uncompressable. File attributes for other standard network operating systems such as UNIX and Microsoft WindowsNT™ are also contemplated.

The local catalog may be arranged according to many well-known organizations including a tree organization which starts at a root directory and defines a path name from the root directory through subdirectories to a desired file. The below Table 1 gives an example of the kind of information that might be stored in a subdirectory of a local catalog.

TABLE 1

Path=AcctServr\Cvolume\Accounts\New\ 4 Files

| File_name | File_size (KBytes) | Last_Rev (yymmdd hh:mm) | By | First_Ver (yymmdd hh:mm) | Owner |
|---|---|---|---|---|---|
| dave.doc | 1546 | 931004 09:15 | tom | 921224 16:45 | dave |
| dave.do1 | 1297 | 931105 11:23 | tom | 921224 12:25 | dave |
| tom.doc | 1881 | 930906 09:15 | dave | 910115 09:45 | tom |
| paul.doc | 1965 | 931107 11:23 | tom | 921224 12:25 | paul |
| *** | | | | | |

Note that the information in the local catalog (Table 1) is only for the files stored on the local storage medium (e.g., the primary storage means 111) and does not cover files stored in other storage media, either at the same network site or elsewhere in the domain.

A dashed bubble at 111.0 is used in FIG. 1 to represent the contents of the local catalog for the primary storage means 111 of the first DAS-managed file-server 110. It is to be understood that if there is a secondary storage means 112 present within first file-server 110, such a second storage 112 will have its own local catalog 112.0. A bubble for the secondary storage local catalog 112.0 is not shown in FIG. 1 due to space limitations. Similarly, the backup storage means 113, if present, will have its own local catalog 113.0 (not shown) and the archive storage means 114, if present, will have its own local catalog 114.0 (not shown). Additionally, if files are distributed across plural drives in accordance with RAID technology (115), each local catalog may be organized to identify the locations within each of the plural drives where redundant information for a given file is stored.

Although not fully shown, it is to be understood that the second DAS-managed file-server 120 has an internal structure that is generically similar to that of the first file-server 110. The physical components of the second file-server 120 may be located at a different network site from that of the first file server 110 and the characteristics of the components in the second DAS-managed file-server 120 may differ substantially from those of the first file-server 110. This is not to say that the second DAS-managed file-server 120 cannot be alternatively located at the same site and/or have substantially similar components as those of the first file-server 110. Rather it is to indicate that the second DAS-managed file-server 120 is to be thought of as having its own independent structure and that this structure, in its specifics, may be similar to or different from that of the first file-server 110.

More specifically, it is to be understood although not shown, that the second DAS-managed file server 120 has one or more of its own primary storage means 121, secondary storage means 122, backup storage means 123 and archive storage means 124. A RAID structure 125 (not shown) may or may not be provided within DAS-managed file server 120. Each of storage means 121–124, if present in the second DAS-managed file-server 120, has a corresponding local catalog 121.0–124.0 (not shown).

The combination of local catalogs 121.0–124.0 associated with the second DAS-managed file-server 120 is represented by dashed bubble 12X.0 in FIG. 1. (In similar vein, the combination of the earlier-described local catalogs 111.0–114.0 associated with the first DAS-managed file-server 110 will be referred to as 11X.0.)

For purpose of example, it will be assumed that the second DAS-managed file server 120 is located at a second site which is quite remote from the location site of the first DAS-managed file server 110. Hence the combination of local catalogs 121.0–124.0 associated with the second DAS-managed file-server 120 will be referred to as the second site local catalogs 12X.0.

In addition to having its own bank of storage devices 121–124, the second file server 120 has its own infrastructure support system 180'. Infrastructure support system 180' is similar to that of the earlier described system 180 with the exception that the second infrastructure support system 180' is located at the second site together with the remainder of second file-server 120. Although not shown, the corresponding UPS, temperature control, component security, and data-path integrity-check modules of the second infrastructure 180' will be respectively referenced as 181', 182', 183' and 184'.

It is to be understood that a local infrastructure support program 126 is installed in server computer 120' of the second DAS-managed file-server 120 just as infrastructure support program 116 is installed in server computer 110' of the first site. A symbol for infrastructure support program 126 is not shown in FIG. 1 in order to avoid illustrative clutter. It is to be similarly understood that the second-site server computer 120' may have a local backup execution program 127 (not shown) installed therein, and a local hierarchical storage migration control program 128 (not shown) installed therein.

Furthermore, the second file server computer 120' has its own set of domain/local exchange agent programs 129 installed therein. These domain/local exchange agents 129 are used for cooperatively exchanging messages between the domain administrating server (DAS) 150 and portions of second-site server computer 120' as will be explained below. A symbol for exchange agent programs 129 is shown in FIG. 1 just behind the symbol for domain/local exchange agents 119.

It is to be understood that physical communication signals between any two or more of the DAS-managed file servers 110, 120, . . . , 140 and the domain administrating server 150 travel along the network-linking backbone 105. Sets of dash-dot lines are included in FIG. 1 for showing the logical flow of certain communications.

In particular, a first bundle of such dash-dot lines 101 is drawn to represent a first flow of communications between the domain administrating server 150 and the domain/local exchange agents 119, 129, . . . , 149 (the last one belongs to server computer 140'). The first logical communications flow 101 includes: catalog snapshot data requests and responses; migration and backup scheduling requests/commands; SNMP (Simple Network Management Protocol) reports of status or alerts; and other types of information as will be explained later.

A second such bundle of dash-dot lines 102 represents a second flow of logical communications 102 which take place between the domain administrating server 150 and administrative or user workstations 160, 161, . . . , 170. The second logical communications flow 102 includes requests for information on domain-wide status and trends as will be explained below.

A third bundle of such dash-dot lines 103 represents a third logical flow of communications which take place between the local catalogs 11X.0, 12X.0, . . . , 14X.0 of respective systems 110, 120, . . . , 140 and a soon-to-be described domain-wide virtual catalog 150.00 (current snapshot) that is defined in the primary storage 151 of the domain administrating server 150.

As should be already apparent, any additional number of DAS-managed file servers similar to above-described file servers 110 and 120 can be connected to the network-linking backbone 105 and each such additional server can be located at a site remote from the sites of the other servers or at a same site. For purposes of illustration, the third DAS-managed file server 140 is shown as the last in a chain of such file servers 110, 120, . . . , 140. Like the above-described other file servers 110 and 120, the third file server 140 is understood to have its own infrastructure 180", its own set of data storage means 141–144 (not shown) and its own set of installed programs 146–149 (not shown except for last item). The last named item, 149, represents the domain/local exchange agent programs 149 of system 140 and a symbol for this collection of field agent programs is shown in FIG. 1 lying beneath the symbol for 129. The combination of local primary, secondary backup and archive catalogs for system 140 are represented by bubble 14X.0. The third logical communications flow 103 collects the contents of catalogs 11.X, 12.X, . . . , 14.X and integrates them into a soon-described, domain-wide virtual catalog 150.00.

The domain administrating server (DAS) 150 has a client/server type of computer 150' similar to those of already described servers 110, 120, . . . , 140 with the exception that the domain administrating server 150 is not intended to store individually-owned user files for use by individual network users. Instead, the mass storage means (e.g. 151) of the domain administrating server 150 is used primarily for storing information related to domain-wide activities.

A first domain-wide activity that is supported by the domain administrating server (DAS) 150 is the maintenance of a current-snapshot of a domain-wide "virtual" catalog 150.00. Although the non-volatile data storage means 151 of the domain server 150 does not contain all the data stored in all the various data storage means 111, 112, . . . , 143, 144 of the remainder of the domain 190, the virtual catalog 150.00 is constructed to create an impression of such a case. Hence the name domain-wide "virtual" catalog is given to the data structure represented by dashed bubble 150.00.

The information of the domain-wide virtual catalog (current snapshot) 150.00 is held in a domain administrating data/rule base 150.1. The database portion of this construct 150.1 is preferably of a relational database type so that entries can be conveniently updated and searched according to a variety of known database update and query schemes. One embodiment of the invention uses a relational-style database package bearing the tradename MDBS IV™ which is available from Micro Data Base Systems Inc. of Lafayette, Ind. (U.S. postal zip code 47902).

A domain-wide status-monitor and control program 150.2 is installed in the domain administrating server 150. One of the domain-wide status monitoring functions of program 150.2 is to: (1) periodically scan the domain 190 and interrogate each DAS-managed file-server 110, 120, . . . , 140 regarding the contents of each local catalog 111.0, 112.0, . . . , 144.0 that is associated with each of data storage device 111, 112, . . . , 144 in the network domain 190; (2) to collect the file identifying information stored at a given scan time in each such local catalog by way of the network-linking backbone 105, and (3) to integrate the collected information into the domain-wide virtual catalog 150.00 so that each user file stored in the domain 190 during a given scan-period can be identified by time-of-scan, file-name, location or other relevant attributes simply by consulting the domain wide virtual catalog 150.00.

Each time a new scan of the domain 190 is carried out, and new information is collected, the older information which was collected by previous scans is preferably retained and re-labeled as belonging to the appropriately-dated previous scan rather than being discarded. A historical collection is thereby created. There will be some point, of course, when it will be desirable or necessary to discard older data. An example is where the used-space of storage means 151 begins to reach maximum capacity. In such a case, nonessential older data should be archived or discarded to make room for more recent data.

The data of each DAS scan is referred to as a "snapshot". After a number of time-spaced snapshots are taken, the domain administrating data/rule base 150.1 defines a historical record for every file in the domain 190. FIG. 1 shows two previous snapshots 150.01 and 150.02 behind current snapshot 150.00. There, of course, can be many more.

Each snapshot 150.00, 150.01, 150.02, etc., of the domain-wide virtual catalog should, of course, include information indicating the time of the respective domain-wide scan. The stored snapshot information should also indicate which physical server provided the file-status information and which local catalog served as the source of each file-identifying entry.

Consider the below Table 2 which shows an example of what might be displayed to an inquiring administrator or user when the domain administrating data/rule base 150.1 of the domain server is queried for virtual catalog information.

TABLE 2

Listing= Virtual_Domain.Catalog    99999999994 Files
(Snapshot Period: 900101 to 931130)

| File_Source | File_Name | File_Size (KBytes) | Last_Rev (yymmdd hh:mm) | By | ... |
|---|---|---|---|---|---|
| Acct111.0\... | dave.doc | 1546 | 931004 09:15 | tom | ... |
| Acct111.0\... | dave.doc | [1544] | 931003 17:35 | paul | ... |
| Acct111.0\... | dave.doc | [1543] | 931002 14:22 | dave | ... |
| Acct111.0\... | dave.do1 | 1297 | 931105 11:23 | tom | ... |
| Acct111.0\... | paul.doc | 1965 | 931107 11:23 | tom | ... |
| Acct112.0\... | tom.doc | 1881 | 930906 09:15 | dave | ... |
| Acct112.0\... | tom.do2 | 0000 | 930906 09:15 | dave | ... |
| AcctBak.0\... | dave.doc | 1544 | 931003 11:59 | paul | ... |
| AcctBak.0\... | dave.doc | [1543] | 931002 11:59 | dave | ... |
| AcctBak.0\... | dave.doc | [1541] | 931001 11:59 | tom | ... |
| AcctBak.0\... | dave.do1 | 1281 | 931104 11:59 | tom | ... |
| AcctBak.0\... | tom.doc | 1872 | 930905 11:59 | dave | ... |
| AcctBak.0\... | paul.doc | 1953 | 931106 11:59 | tom | ... |
| AcctArc.1\... | dave.doc | 1530 | 911001 23:55 | tom | ... |
| AcctArc.1\... | dave.do1 | 1260 | 921101 23:56 | tom | ... |
| AcctArc.1\... | tom.doc | 1850 | 910901 23:57 | dave | ... |
| AcctArc.1\... | paul.doc | 1940 | 901101 23:58 | tom | ... |
| AcctArc.2\... | tom.do2 | 1776 | 900906 09:15 | dave | ... |
| Mktg121.0\... | dave.doc | 1544 | 920704 09:15 | tom | ... |
| Mktg121.0\... | dave.do1 | 1297 | 931105 11:23 | tom | ... |
| *** | | | | | |

The query-results header of TABLE 2 is constructed to resemble the result of a Microsoft-DOS DIR *.* list command, with a first exception being that it names a directory that happens to be very large (99999999994 files). A second exception is that it defines a snapshots-taking period (e.g., 900101 to 931130).

The first column of Table 2 shows the file source pathname as beginning with a file-server name (e.g., Acct111.0\ ... or Mktg121.0\ ... ) rather than simply a with a volume or root directory name. The second column shows the file name. Due to space limitations, only the ServerName is shown, but it is understood that the contents of column one can be expanded out to show a full pathname including VolumeName and one or more related directories.

Note that the same file name may appear multiple times in the listing of Table 2, even with identical path names (e.g., "dave.doc"). The difference lies in the date of creation or revision fields. List rows with square brackets around their size field do not have corresponding files still existing within the domain. Rather they are historical shadows that may be used for auditing the trail of who last modified the file, when, and to what extent did file size grow or shrink.

In addition to historical shadows, existing versions of a file may be distributed through out the domain. One version of a file with a same file-name might appear in the primary storage of a particular file server while a second version appears in backup storage and a third version appears in archive storage. Some copies of the same file may be distributed among different file servers.

In the example of TABLE-2, a first file named "dave.doc" is stored in the primary storage server of the accounting department (source=Acct111.0\...) with the current version being the one most recently revised and historical shadows being indicated by square brackets (e.g., "[1544]") about their file size entries. Another same-named file is stored in the backup storage server (source=AcctBak.0\...) and yet another same-named file is stored in the archive storage server (source=AcctArc.1\...) and still another version of the same-named file is stored in the primary storage of the marketing department (source=Mktg121.0\...). The size-zero file entry for tom.do2 in the Acctl12.0 server is merely a place marker indicating the actual file has been moved to archive (to AcctArc.2).

The domain-wide catalogs-snapshot information (150.00, 150.01, 150.02, etc.) that is stored within the domain administrating data/rule base 150.1 can be used to quickly generate the above TABLE 2 using a database query and thereby give an administrator or user information about a given file or set of files even if they are distributed amongst different file servers and in different kinds of storage (e.g., primary, secondary, backup and archive). The database structure of the domain-wide catalogs-snapshot information (150.00, 150.01, 150.02, etc.) provides a quickly-accessible, multi-dimensional view of what is happening across the domain both spatially and temporally as well as by file attributes.

The searchable database fields preferably include: ScanTime (which is the time period for which the collected data was current); FileName; PathName (the storage pathname including searchability by ServerName); FileSize; FileChronology (in terms of for example, Creation date and time, latest Modify or revision date and time, latest read-only Access date and time, and latest Archive date and time); FileUser information (in terms of who is the "Owner" or original creator of the file, who was the LastModifier of the file, who has read/write/execute permission for this file, and so forth); and Netware attributes such as the Novell-defined attributes: System, ReadOnly, ExecuteOnly, Subdirectory, Archive, Shareable, Compress, Salvageable, Purgeable, Migrated, Indexed, ReadAudit, WriteAudit, ImmediatePurge, RenameInhibit, DeleteInhibit, CopyInhibit, ImmediateCompress, CompressInhibit and Uncompressable.

Figure 2:
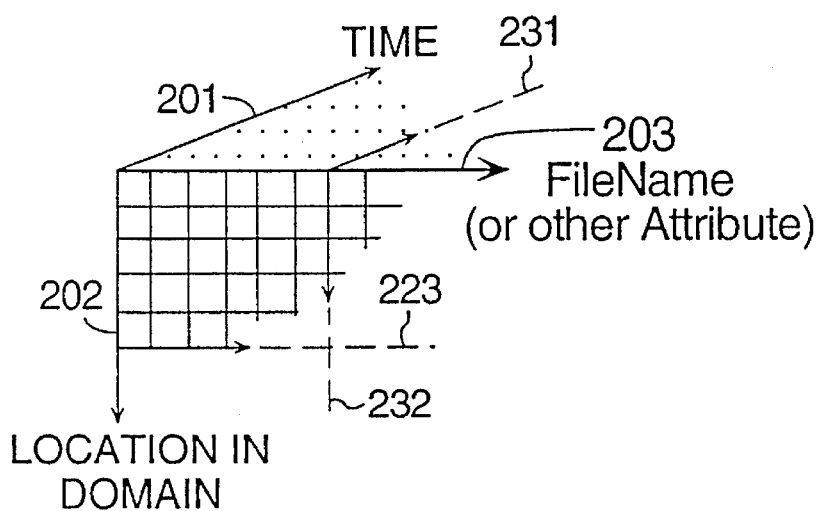
FIG. 2 is a perspective view of a multi-dimensional viewing window for visualizing domain-wide activities spatially, temporally and by file attributes.

FIG. 2 illustrates this concept graphically in terms of a three-dimensional cube. The orthogonal XYZ axes are labeled 201–203. Axis 201 represents time of snapshot. Axis 202 represents location within the domain either in physical, global terms or within a type of storage media such as primary (P), secondary (S), backup (B) and/or archive (A). Axis 203 represents variation in file name and/or other file attributes.

Line 231 runs along the 201/203 plane in the 201 direction and represents a listing of file attribute versus time. By way of simple example, line 231 may represent a listing of all versions over time of a particular file having a specified name (e.g., dave.doc). A database query can be written to search the domain-wide virtual catalog snapshots, 150.00, 150.01, 150.02, etc., and generate a listing of all files located along line 231 as will be understood by those skilled in the art. Wildcard searches of the form, for example, "LIST dav?.do*" can broaden the scope of the search and list operation to cover files whose names conform to a particular pattern.

Line 232 runs along the 202/203 plane in the 202 direction and represents a listing of file attribute versus location. By way of simple example, line 232 may represent a listing of all copies of files having a specified name (e.g., dave.doc) that have been stored ever or during a specified time period in any one or more of: primary (P), secondary (S), backup (B) and archive (A) storage. A database query can be written to search the domain-wide virtual catalog snapshots, 150.00, 150.01, 150.02, etc., and generate a listing of all files located along line 232, or only those in a selected subset of the P, S, B and A storage categories as will be understood by those skilled in the art.

Line 223 runs along the 202/203 plane in the 203 direction and represents a listing of location versus file attributes. By way of simple example, line 223 may represent a listing of all files stored at a particular time in a specified domain location (e.g., archive storage) that satisfy the name search criteria, "LIST day?.do*", where the symbol "?" represents a single-character wild card and "*" represents an N-character wild card.

The database information contained in the domain-wide virtual catalog snapshots, 150.00, 150.01, 150.02, etc., may be sorted according to any number of other schemes to provide the system administrator with all sorts of information including, but not limited to: (1) locating the latest version of a particular file regardless of where it is stored within the domain; (2) determining which files have been properly backed up in a recent time period and which have not, (3) reviewing the performance of the hierarchical storage management system (HSM) at each site and (4) viewing a historical snapshot of a file as various versions of it are migrated from primary to secondary storage and then perhaps to archive.

In the above listing of Table 2 for example, plural instances of the document named "dave.doc" appear. It can be determined from the listing that the latest version of "dave.doc" was stored in the primary storage server Acct111.0 of the Accounting Department on Oct. 4, 1993, while a backup copy was stored on the AcctBak.0 server the day before and yet another version was placed in an archive tape or disk volume named AcctArc.1 on Oct. 1, 1991. Yet another copy of the document "dave.doc" is found in the Marketing Department on a primary storage server named Mktg121.0, and it was last modified by a user named "tom" on Jul. 4, 1992.

Since the contents of the domain-wide virtual catalog snapshots, 150.00, 150.01, 150.02, etc., are held in a database 150.1 whose contents can be searched according to all type database queries (e.g., using a Standard Query Language or SQL) the types of information that can be gleaned is up to the system administrator's creativity. A system administrator might wish to simply track the progress of a particular file according version number (e.g., latest modification dates and times) or he or she may wish to study the migration patterns of certain classes of files from primary (P) to secondary (S) to archive (A) storage and from any of those to backup (B) storage. A search primarily on file name and secondarily on volume location and dates will reveal a historical view of where and when various versions of like-named files have been stored to secondary, backup and archive media.

Depending on the fields chosen as primary, secondary or tertiary search fields, if any, a system administrator can easily obtain views of various domain-wide activities, including but not limited to: (1) the amount of total primary storage available at each file server site——this is most quickly determined by looking at the total active bytes in the collective VolumeSize entries of the servers on-site, (2) the amount of used versus free storage space available in the primary storage of each file server, (3) the size, age and types of files that have been most recently moved to secondary storage at each file server by the local hierarchal storage management (HSM) programs 118, 128, ... 148, (4) the size, type and age of all files that have been most recently moved from primary storage to backup storage across the domain 190 by the respective local backup execution programs 117, 127, ... , 147 of the system, (5) the size, type, and age of files that have been archived to various archive volumes across the domain, (6) the distribution of files having particular file names or file types across primary, secondary, backup and archive storage as seen across the domain 190, including the date of last revision and storage into each type of storage media or the date of last read-only access, and so forth.

The domain administrating server (DAS) 150 makes it possible to perform these various domain-wide studies at high speed because all the necessary information is stored in a centralized location, having been earlier collected, integrated, placed in a searchable database and organized according to desired search fields. Excessive time may be required if the DAS 150 were not present and an administrative workstation 160 tried to scan the domain 190 on its own to collect the desired information from all the file servers 110–140 on the network, organize it into a searchable database, and so forth. Also a disadvantageous duplication of work will occur if two or more administrative workstations 160, 161, etc., are asked to simultaneously but independently scan the domain 190 for the same information and collect it by way of network backbone 105. Such a process would also lead to excessive traffic congestion on the net-work-linking backbone 105, particularly where multiple studies of domain-wide activities are desired.

Figure 3A:
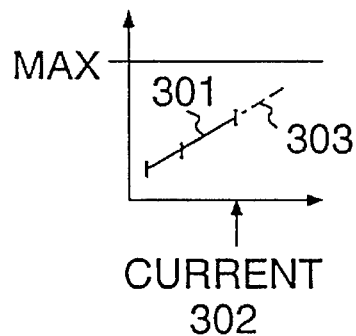
FIGS. 3A–3B show a set of trend analysis graphs that may be developed from the domain-wide, virtual catalog snapshots obtained by the system of FIG. 1.
Figure 3B:
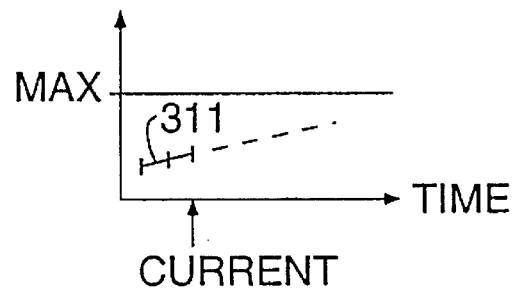

Domain-wide studies can be used for recognizing a variety of current status problems and for performing various trend analysis functions. FIGS. 3A and 3B show one example. In FIG. 3A, a line plot 301 graphs storage capacity utilization versus time, up to a current snapshot time 302. Line plot 301 shows that a first disk drive (DRIVE-A) belonging to a first server will soon run out of free space if line 301 is extended at its current slope into the future, as indicated by dashed portion 303. A side-by-side comparison with a historical plot 311 of storage capacity utilization in FIG. 3B ——for a second disk drive (DRIVE_B) that belongs to a second server——shows that the second disk drive (DRIVE-B) is being underutilized even though it perhaps has less total storage space (a lower MAX level) than the first disk drive (DRIVE-A) and that the first disk drive (DRIVE-A) is perhaps being overutilized. (The slope of line 311, which shows active storage space versus time for DRIVE-B, is substantially less than the slope of the DRIVE-A line 301.) In view of these plots a human administrator, or an artificially-intelligent automated administrator (see element 150.25 of FIG. 6), might decide to rearrange the work loads of the respective first and second servers so that the loads are more fairly balanced. One way is to reassign some users of over-utilized DRIVE-A to the underutilized DRIVE-B.

Status and trend-analysis reports can be generated as line plots, pie charts, bar graphs and so forth to give viewers a picture of what is happening on the studied domain 190 currently, what happened in the past, and what trends will probably evolve over time given past and current domain-wide activities.

Figure 4A:
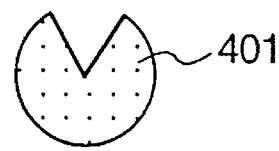
FIGS. 4A–4B show side-by-side examples of pie charts showing used-versus-free storage space on respective storage drives DRIVE-A and DRIVE-B within the domain of FIG. 1.
Figure 4B:

FIGS. 4A and 4B show side-by-side examples of pie charts 401 and 411 showing used versus free storage space on respective drives DRIVE-A and DRIVE-B within the domain. (Note that pie 411 has a smaller diameter than pie 401 thereby indicating a smaller maximum capacity level (MAX).) A large number of side-by-side pie charts (or bar charts——with used part of capacity rectangle shaded and unused part unshaded) can be displayed on the screen of the system administrator's workstation (160) at one time to give the administrator an instantaneous appreciation storage capacity and utilization across a substantial part if not all of the domain. If historical trends are to be viewed on a pie or bar chart, different colors or fill patterns can be assigned to slices of a pie or bar chart to represent incremental changes over time.

Trend-analysis studies can be used to look for, by way of example: load shifts on a by-the user basis, on a by the volume basis, on a by-the server basis, on a by-the network site basis, on a used-versus-free space ratioed basis, and so forth. Each analysis can warn of an upcoming problem and suggest a solution. More drives may have to be purchased for a very active site that needs fast response time. The files of a user who has gone of on vacation or left the company might be moved to archive storage so as to free up space for other users. And so forth. The centralized availability and quick accessibility of the domain-wide virtual catalog snapshots, 150.00, 150.01, 150.02, etc., makes such trend studies easier to implement.

The current snapshot of the domain-wide virtual catalog 150.00 can be used by itself to assist in cross-domain file transfers. These are transfers that require a movement of data from one server (e.g., 110) to a second server (e.g., 120). After a particular file is located in for example, the archive storage of a first server through the use of the domain-wide virtual catalog (current snapshot) 150.00, it may be desirable to request a transfer of a copy of the archived file to the primary storage of a particular, second server. The user screen will show a listing such as above TABLE 2. The information in the listing is extracted from the domain-wide virtual catalog (current snapshot) 150.00. A drag-and-drop operation may be provided within a user interface (165 or 175) of a workstation wherein the user highlights, with a first mouse click, the name of the desired source file and the user then drags-and-drops a copy of the highlighted block into a directory entry of a second server, which directory entry is also shown on the screen. Depending on context, the domain administrating server (DAS) 150 can responsively issue appropriate permissions to allow the corresponding transfer to take place immediately across the network-linking backbone 105 or at a scheduled later time. Because the source file in this particular example is an archived file, a retrieve and mount task will be appended to a schedule list made for a system operator, and the transfer will take place at the time the archived media is mounted.

The domain-wide activities of moving files across the domain 190, and/or generating domain-wide storage traffic and trend views, are just a few of the many domain-wide activities for which use of the domain administrating server (DAS) 150 can be advantageous.

Before delving into other such activities, it is worthy to note that an administrative or user workstation 160, 161, . . ., 170 can be located anywhere along the enterprise 100 and such a workstation 160, 170 can nonetheless communicate with the DAS 150 to access the information contained in the DAS 150 for purposes of analysis or other use. It will be shown below that any administrative workstation 160, 161, etc., can interact with or activate one or more of a set of below-described domain control operations from any place along the network by accessing the DAS 150. There are several advantages to such a scheme.

The domain administrating server (DAS) 150 serves as a central repository for collecting domain-wide information and as a central command post from which domain-wide control commands can be broadcast. One advantage of this scheme is that the DAS 150 can provide a consistent interface to the remainder of the domain 190 or to the remainder of the networked enterprise 100.

Domain-wide information is preferably collected by the domain server (DAS) 150 during low-traffic periods so as to minimize the effect of such collection on other network activities. Once collected, the information is available for quick access by an administrative workstation 160, 161 located anywhere along the network. Each administrative workstation 160, 161 is loaded with a same administrative graphical user interface package 165 so that a consistent administrative interface is presented to the data/controls of the domain server (DAS) 150 regardless of where on the network the user is located. A network administrator does not have to be concerned with the particular user interface provided at each file server site (e.g. Microsoft Windows™ versus Microsoft DOS™) because the information from these various sources are passed by the domain/local exchange agents 119, 129, . . . , 149 to the domain server 150 and then passed back to the system administrator in a consistent manner through the administrative graphical user interface 165.

A permissions-limited version 175 of the administrative graphical user interface 165 may be provided for users of different experience or privilege levels so that such users can also have a homogeneous, though perhaps restricted, interface to domain-wide data irrespective of where in the domain that data is actually stored.

In one embodiment, the administrative graphical user interface 165 conforms to standard Microsoft Windows™ format and provides user features such as ones listed in below Table 3.

TABLE 3

Section 3.1: Basic Interface Operations

The user interface shall include:
>> Drag and drop manipulations of graphical objects to provide an intuitive method for selecting objects, and grabbing and dragging them to desired action icons
>> Button bar to ease and speed the selection of typical tasks
>> Context sensitive Help
>> A Menu Bar including drop-down menus named File, Edit, Tree, View, Tools, Options, Window, and Help with the drop-down menus changing in content based on the current focus Section 3.2: File Drop-Down Menu Operations The File drop-down menu shall consist of the following selections:
New TABLE 3-continued Open
Save (button bar icon)
Save As
Delete
Print Preview
Page Setup
Print (button bar icon)
Exit Section 3.3: The Edit Drop-Down Menu Operations The Edit drop-down menu shall have the following selections:
Hold
Release
Delete
Move
Cut
Copy
Paste Section 3.4: The Tree Drop-Down Menu Operations The Tree drop-down menu shall have the following selections:
Tree
    Expand 1 level
    Expand Branch (button bar icon)
    Expand All (button bar icon)
    Collapse Branch
    Sort
        Name
        Type
        Size
        Date
    Split Section 3.5: The View Drop-Down Menu Operations The View drop-down menu shall have the following selections:
Graphical Form (button bar icon(s))

Pie
    Bar
    Line
    Summary
    Forecast
    Variance
    XYZ Axis Definitions (with selections being
        FileName, FileAge, and Users)
    Options
        Title
        Description
        Legend
        Headers
        Footers
File Definition (button bar icon)

DOS Wildcard
    Directory
    Programs
    Documents
    Hidden/System
    Date Range
    Archived
    Migrated
    Compressed
    Non-Compressable
    Other Netware attributes as appropriate
User Groups (button bar icon)

Wildcard
    Selected
Virtual Storage View Filter (button bar icon)

Backup
        Storage Server (HSM)
        Date Range
        Media Element
        Backed up only

TABLE 3-continued

Archived only
Migrated
    Storage Server (HSM)
    Date Range
    Storage Layer
    Media Element

Section 3.6: The Tools Menu Operations

The Tools drop-down menu shall have the following selections:
    Storage System Monitor (button bar icon)
    Scheduler (button bar icon)
    User Groups Editor (button bar icon)
    Snapshot
    Backup
    Migration
    RAID

Section 3.7: The Options Menu Operations

The Options drop-down menu shall have the following selections:
    Client Server Polling Settings
    Log File Retention
    Log File Paths

Section 3.8: The Windows Menu Operations

The Windows drop-down menu shall have the following selections:
    New
    Cascade
    Tile
    Refresh

Section 3.9: The Help Menu Operations

The Help drop-down menu shall have the following selections:
    Contents
    Search
    Tutorial
    Support
    About Help
    About System Administrator A tree-style view of how data and resources are distributed across the domain 190 will produce an introductory screen on the administrative or user workstations 160, 161, . . . 170 having the hierarchical form shown in below Table 4.

TABLE 4

Network ACCESS TREE

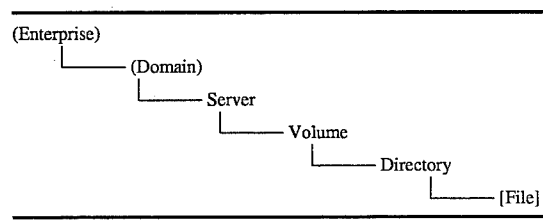

A mouse-based or other "expand" selection of the displayed "Enterprise" field will provide an on-screen listing of N domains (by DomainName), any one of which can be designated as a currently-selected domain. Additional information regarding the status of each domain (e.g., up and running, shutdown, length of up/down time, total storage capacity, etc.) may be displayed at the same time. The listing can be sorted by name, date, size and so forth.

Similarly, a mouse-based or other "expand" selection of the displayed "Domain" field will provide an on-screen listing of a plurality of N servers (by ServerName) within the current domain, any one of which servers can be designated as a currently-selected server. Additional information regarding the status of each server may be displayed at the same time (e.g., up and running, shutdown, length of up/down time, number of users, workload level, etc.) The names of up and running servers can be obtained from the domain-wide virtual catalog (current snapshot) 150.00 since down servers will not respond to a current snapshot scan. The database 150.1 of the DAS 150 preferably includes a section storing location information about each server in terms of: Country, Region, State, City, Campus, Building, Department and Office. This location information may be displayed together with the name of each server and its status. The listing can be sorted by name, date, size and so forth.

A mouse-based or other "expand" selection of the "Server" field of Table 4 will provide an on-screen listing of a plurality of M volumes (by VolumeName) that are currently mounted within the currently-selected server, any one of which volumes can be designated as a currently-selected volume. Additional information regarding the number of files and amount of total versus free space in each volume may be displayed at the same time. The former and latter information is obtained from the domain-wide virtual catalog (current snapshot) 150.00. The database 150.1 of the DAS 150 preferably includes a section storing scan information for each volume in terms of: ScanDate, ScanStartTime, ScanStopTime, ScanName and ScanRequesterId (the ID number of the administrative workstation that requested the scan or of the DAS module that requested the scan). This scan information may be displayed together with the name of each volume and its corresponding volume attributes. The listing can be sorted by name, date, size, type of storage (e.g., primary (P), secondary (S), backup (B) or archive (A)) and so forth.

A mouse-based or other selection of the "Volume" field of Table 4 will provide an on-screen listing of a plurality of K directories (by DirectoryName) defined within the currently-selected volume, any one of which directories can be designated as a currently-selected directory. Additional information regarding the number of files and amount of total versus free space in each directory may be displayed at the same time. The former and latter information is obtained from the domain-wide virtual catalog (current snapshot) 150.00. The listing can be sorted by name, date, size and so forth.

Similarly, a mouse-based or other selection of the "Directory" field of Table 4 will provide an on-screen listing of a plurality of J files (by FileName) within the currently selected directory, any one of which files can be designated as a currently-selected file for viewing, copying, renaming, moving, printing, or other manipulation (See Section 3.2 of above Table 3). The listing can be sorted by name, date, size and so forth.

No operation is provided for clicking on the "File" field of Table 4. It is there just to show the next level below that of Directory.

File manipulation operations such as opening, renaming, and so forth will, of course require access to the corresponding local catalog and/or the corresponding actual data within the respective file server rather than mere access to the domain-wide virtual catalog (current snapshot) 150.00. If a file is to be copied or moved from one file server to another, such a transfer will probably require data transfer across the network-linking backbone 105. This brings us to another area where the DAS 150 becomes quite useful, traffic control.

Traffic scheduling is a problem on networked systems. Users have come to expect instantaneous response to their file access and other requests. But the network-linking backbone 105 and/or other components of the system can at times become overwhelmed with a deluge of job requests if care is not taken to schedule data transfer tasks across the backbone 105 and/or through other components of the system (e.g., disk drives) so that the workload of each such component is distributed in a fairly balanced manner over time.

Traffic scheduling and control is one of the important domain-wide activities supported by the domain administrating server (DAS) 150. Because it is relatively common to have a primary storage means (111) located at a first site, a secondary storage means (122) located at a second site, a backup storage means (133) located at a third site and an archive storage means (144) located at yet a fourth site; the network-linking backbone 105 is routinely used for massive data transfers such as those that take place when a large set of aged files are migrated from primary to secondary storage or when a bulk portion of the files in the domain are being backed-up or archived. The data-transfer bandwidth of the network-linking backbone 105 and/or various file servers can become saturated during such bulk data transfers, thereby blocking individual users from obtaining immediate access to desired files.

It is accordingly preferable to schedule operations which tend to saturate the backbone 105 (e.g., backup and migration) to time periods which otherwise exhibit relatively low traffic volumes and to distribute these jobs over time so as to avoid traffic congestion on the network-linking backbone 105 or elsewhere.

Figure 5:
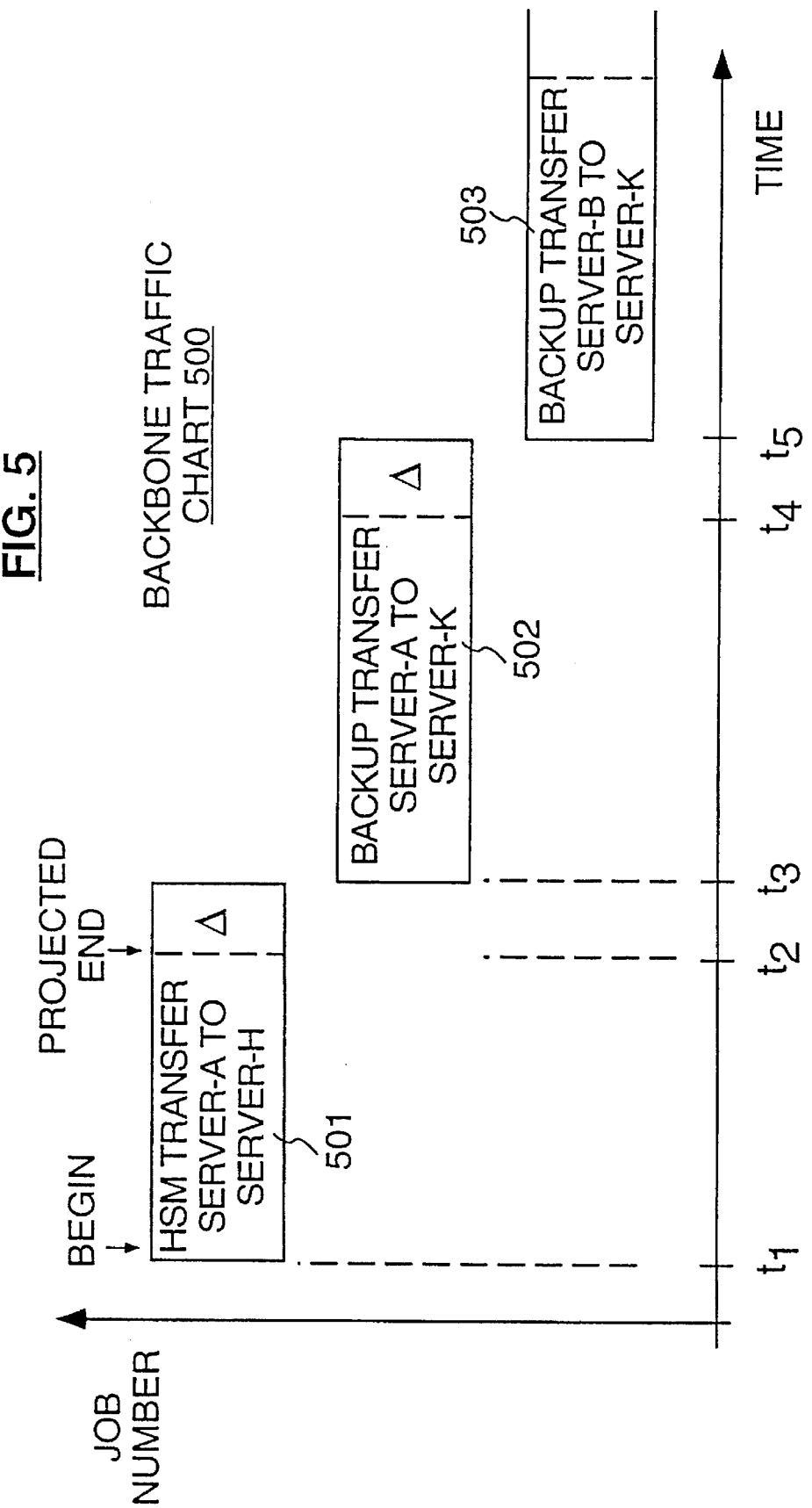
FIG. 5 a job scheduling chart for minimizing traffic congestion on the network-linking backbone.

FIG. 5 shows a Gant-style traffic chart 500 that illustrates an example of how bulk data transfers can be distributed across time to balance work loads and ease congestion on the network-linking backbone 105. A first HSM migration transfer 501 is scheduled to take place between first and second time points, $t_1$ and $t_2$, and to move a set of files from a first file server-A to a secondary storage server-H. The transfer completion time $t_2$ is projected to occur a certain length of time after the transfer begin time $t_1$, based on the size of the files to be transferred. (The latter information is obtained from the domain-wide virtual catalog (current snapshot) 150.00.) But because unexpected events can occur during the transfer (e.g., transient error and recovery operations), a certain amount of slack (delta) time is added before the next data transfer job 502 begins at time $t_3$.

A similar approach is followed for following job 503. In the example, job 502 is a backup transfer from server-A to server-K and job 503 is a backup transfer from server-B to server-K, where servers A, B, H and K are understood to all reside in the same domain 190 but at different network sites. Note that the jobs 501–503 are arranged to be nonoverlapping in the time domain so as to avoid traffic congestion on the network-linking backbone 105.

In order to provide a smoothly distributed job schedule such as that shown in FIG. 5, one has to know: first, what periods of time are most likely to exhibit low traffic congestion on the network-linking backbone 105; second, what amount of time is expected to be consumed by each bulk data transfer job; and then one has to order the transfer jobs for best fit relative to the available low-congestion time slots.

Figure 6:
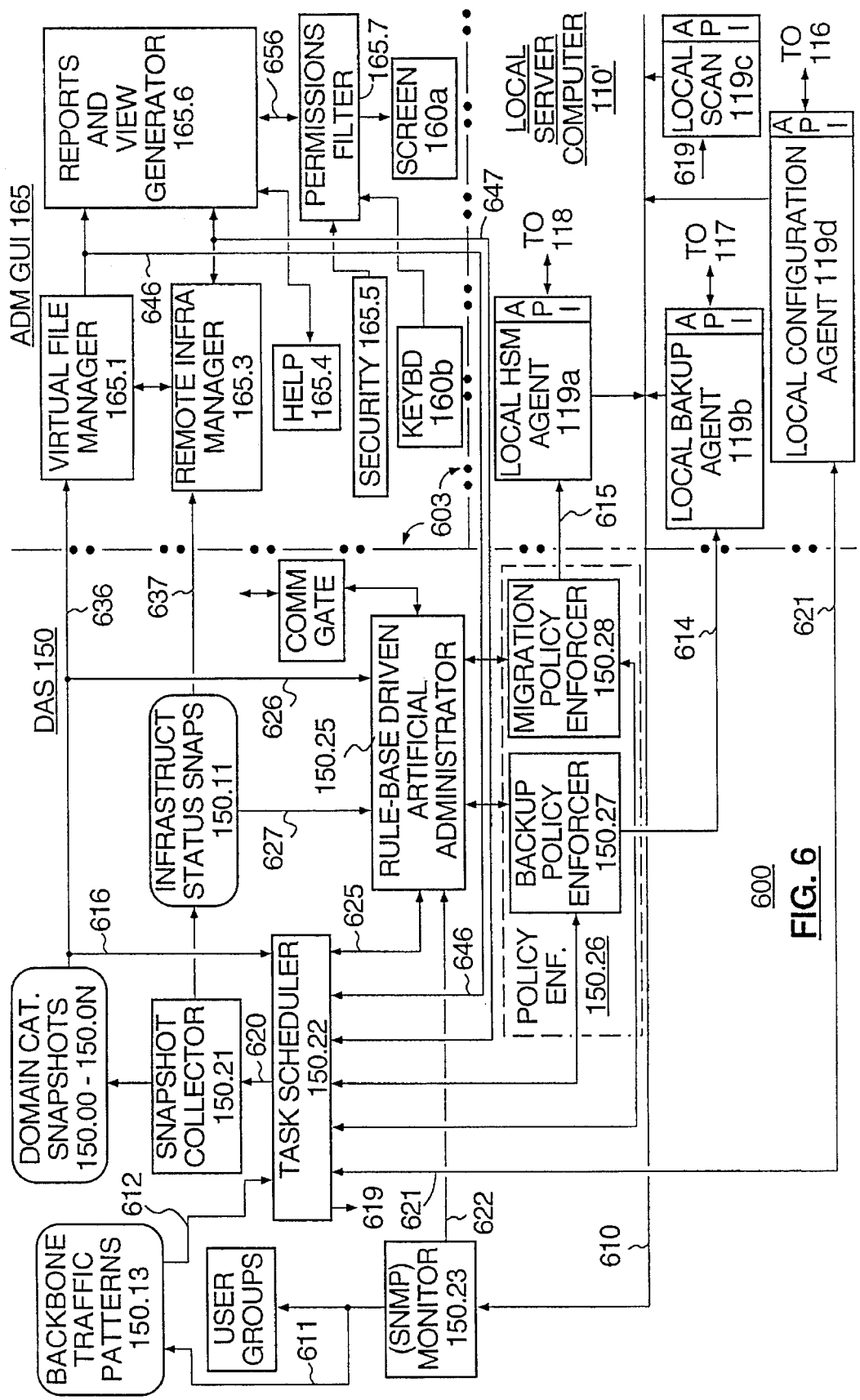
FIG. 6 shows a logical flow map between various data and control mechanisms distributed amongst the domain administrating server (DAS), an administrative workstation, and a given server computer.

Referring to FIG. 6, a map 600 is shown of logical flows between various data and control mechanisms distributed amongst the domain administrating server (DAS) 150, the GUI 165 of an administrative workstation, and the DAS/local field agents 119a–d of a given server computer 110'.

Map 600 is subdivided into three sections by a set of dash-doubledot partition lines 603. Logic flow crossings through the dash-doubledot partition lines 603 are understood to represent signal flow through the net-work-linking backbone 105 (FIG. 1).

A backbone monitor 150.23 is provided within the domain-wide status monitor/control program 150.2 of the DAS 150 for monitoring message packets 610 traveling along the network-linking backbone 105 to determine what time periods or other conditions correlate with respectively low traffic flow on the backbone 105. Data 611 representing time spaced snapshots of backbone traffic patterns 150.13 is loaded into the domain administrating data/rule base 150.1 that is maintained by the DAS 150.

Based on historical traffic information 612 or other information collected into the data/rule base 150.1, a task scheduler 150.22 within the domain-wide status monitor/control program 150.2 of the domain server 150 sends instructions 614 through the partition 603 by way of the local backup field agent 119b of the respective server computer 110' to the corresponding local backup execution program 117 (see FIG. 1).

Backup instructions 614 indicate when the backup activities of that DAS-managed file server 110 should begin and which files should be backed up (e.g. all or only those that have been altered in the last day). An API-like interface connects the local backup field agent 119b to the corresponding local backup execution program 117. The API-like interface, as will be understood by those skilled in the art, translates between a domain-wide standard data format and a local format used by the local backup execution program 117 much as a general purpose API (application program interface) provides interfacing between an operating system kernel and a specialized application program.

A backup policy-enforcer 150.27 is interposed between the task scheduler 150.22 and the local backup field agent 119b for assuring that backup operations specified by instructions 614 comply with certain domain-wide backup policies. These domain-wide backup policies are established either by a human administrator or by a rule-base driven artificial administrator 150.25 that is included in the domain-wide status monitor/-control program 150.2 of the DAS 150. The backup policy-enforcer 150.27 is part of a general, domain-wide policy enforcer 150.26 and the latter program module is part of the domain-wide status monitor/control program 150.2.

In similar manner, further scheduling information 615 is transferred from the task scheduler 150.22 through a migration policy-enforcer 150.28 of the DAS 150 to the local hierarchical storage management program 118 by way of a local HSM field agent 119a. The hierarchical storage management instructions 615 indicate when the migration activities of the instructed file server 110 should begin and which files should be migrated to secondary storage.

Although not shown, it is to be understood that similar scheduling of archive operations moves from the task scheduler 150.22 through an archive policy-enforcer 150.29 to a local archive control agent in the case where the server computer 110' includes an archiving mechanism.

In order to properly schedule domain-wide file transfers such as those involved in backup and migration operations, the task scheduler 150.22 consults the domain-wide virtual catalog (current snapshot) 150.00, as indicated by logic flow 616, to determine the size of each file that is to be transferred. The file size information is used for calculating the time to be consumed by a transfer, given rate information indicating the speed at which each transfer from a first storage means to a second storage means is expected to take place. (The domain administrating data/rule base 150.1 develops such rate information through experience.)

Given the transfer size (flow 616) of each backup or migration job, and the historical traffic patterns (flow 612) of the network-linking backbone 105, the task scheduler 150.22 can determine the time needed for each transfer, what low-traffic slots are available, and how to order jobs to fit into the available slot. If a given transfer job is too big to fit into a single low-traffic slot, the transfer job can be subdivided into plural subtasks and fitted accordingly.

Like backup and migration transfers, the activity of collecting information from the local catalogs of all storage means 111–144 of the domain 190 can at time create traffic congestion on the network-linking backbone 105. Accordingly, the task scheduler 150.22 schedules the operations of a snapshot collecting portion 150.21 of the domain-wide status monitor/control program 150.2 so that snapshot collections are timed to occur during low traffic periods.

To speed collection, a local scan agent program 119c is installed in each server computer 110' and asked to scan the local catalogs of that server computer at a designated scan time and to store the results for later pick up by the DAS snapshot collector 150.21. Instruction flows 619 and 620 respectively move from the task scheduler 150.22 to the local scan agent program 119c and the DAS snapshot collector 150.21 for coordinating the activities of the two.

Yet another primary domain-wide activity of the domain administrating server 150 is oversee and manage the local infrastructures of its domain. Each local infrastructure support program 116, 126, . . . , 146 (FIG. 1) periodically scans its corresponding local infrastructure 180, 180', ... 180" to check the status of the power supplies (UPS) and other parts of the local infrastructure, and then stores a local snapshot of infrastructure status. The infrastructure status information can include information indicating local power supply conditions (e.g. each of redundant power supplies is turned on or off), local temperature conditions and local component security conditions (e.g. the open or shut status of various cabinet doors). Some file servers include a local watchdog for keeping track of number of recoverable errors encountered during normal utilization of the local storage means 111–114. Such an error history log may also be included in the local snapshot generated by the local infrastructure support program 116, 126, . . . , 146.

A local infrastructure configuration agent program 119d (FIG. 6) having an appropriate API-like interface is provided in each DAS-managed server (e.g., 110') to periodically collect the local infrastructure snapshot generated by the local infrastructure support program 116, 126, . . . , 146 and to convert the status snapshot output by the local infrastructure support program 116, 126, . . . , 146 into a standardized infrastructure status report that has a same consistent format across the domain 190. In other words, although the local infrastructure support program 116 of first file server 110 might produce a status report having a first format and the infrastructure support program 126 of the second file server 120 might generate a status report having a different second format, the respective domain/local exchange subagents 119d and 129d (not shown) of these systems convert the respective infrastructure status reports into domain-wide standardized report formats.

The DAS snapshot collector 150.21 periodically scans the network and retrieves from the respective field exchange agents 119d–149d a respective set of standardized infrastructure status reports. Instruction flows 621 and 620 respectively move from the task scheduler 150.22 to the local scan agent program 119d and the DAS snapshot collector 150.21 for coordinating the activities of the latter two modules.

These collected infrastructure status reports are integrated over a given scan period to define a current snapshot of domain-wide infrastructure status. Repeated scans develop a historical picture 150.11 of infrastructure changes on a domain-wide basis. The domain-wide infrastructure snapshots 150.11 are stored in the domain administrating data/rule base 150.1 in similar fashion to the virtual catalog snapshots 150.00–150.02 and accessed for viewing and analysis in similar fashion to that of the domain wide virtual catalogs 150.00–150.02.

In many instances it is desirable to maintain within the infrastructure snapshots 150.11, the brand names, manufacturer serial numbers and purchase prices of each piece of hardware equipment (e.g., each server computer, disk drive, tape drive, printer, etc.) at each local site for purposes of asset management. This asset management information is used, first, simply to determine what is "out there". When networks grow very quickly, it is often hard to keep track of what pieces of equipment are on-line (actively coupled to the network) and what pieces of equipment have been taken out of service for one reason or another. If certain pieces of equipment have been returned to the manufacturer for repair, or replaced and sold-off, it is useful to be able to track down such information.

A second reason for maintaining asset management information within the infrastructure snapshots 150.11 is for purposes of performance evaluation. Large networks typically include a collection of server computers from different vendors, disk drives from different vendors, tapes and tape drives from different vendors, printers from different vendors, and so forth. As time goes on, each such piece of equipment develops an error history and a repair/replacement history. It is useful for network administrators to discover which brands of equipment work best in their particular environment and which exhibit poor performance. Then when the network is expanded or problematic equipment is replaced, the system administrators have an idea of which brands of equipment should be avoided and which should be preferred on a price/performance basis.

Even if all equipment is purchased from a top quality vendor, a problematic unit might still be included in the lot due to variances in mass production. The problematic unit does not always make its presence known when first purchased; rather its performance degrades slowly over time so that even if its operations are within specifications at first, they eventually fall out of specification. A system administrator may wish to know ahead of time that such a condition is developing and may wish to be able to plan future purchases or repairs in view of this information. Hence, the combination of asset management information and error rate history information and repair/replace history information that is contained in the infrastructure snapshots 150.11 may be used for trend analysis purposes; to identify those pieces of equipment whose performance is degrading most rapidly and to plan for repair or replacement of such units even before significant problems develop.

Many of the transient-type errors that develop during data exchange between a server computer 110'–140' and its respective mass storage devices 111–144 are handled by local error recovery hardware and software. As observed above, it is useful for the system administrator to collect such information on a domain-wide or enterprise-wide basis so that this information can be evaluated to detect unusual performance and/or trends in performance. However this long-term performance information does not have to be collected immediately as it happens. The DAS 150 can wait for quiet times on the network-linking backbone 105 in which to scan the network and collect this information.

On occasion, problems develop which need to be brought to the immediate attention of a network administrator (artificial one 150.27 or a human one). Examples of such problems include non-recoverable failures of storage devices 111–114, a failure within a power supply 181, failure of a temperature control device 182, security breach such as the opening of an alarmed cabinet door 183, or a connection break as noted by a connection checking module 184. These type of events are referred to herein as immediate-attention events. @ When an immediate-attention event occurs, the corresponding domain/local exchange agent 119–149 issues an SNMP alert report out onto the network backbone 105. The backbone monitor 150.23 includes an SNMP monitor portion which monitors the backbone 105 and distinguishes normal reports from such immediate-notification/action reports. The immediate-attention SNMP reports are tagged as such by the SNMP monitor and forwarded to the artificial administrator 150.25 as indicated by signal flow line 622. The artificial administrator 150.25 uses rule base 150.1 to determine what level of response should accompany each SNMP immediate-attention report. A high-urgency report might require immediate shutdown of part or all of the network. The rules of rule base 150.1 may dictate that an urgent alert message be sent to one or more human administrators by way of the communications gateway 104, 106 (FIG. 1) to their respective wireless pagers (beepers) 107. In some cases, corrective reconfiguration with or without shutdown of various portions of the network may be put off to a later, less congested portion of the day. In such a case, the corrective action would be sent to the task scheduler 150.22. Cooperative signal exchanges between the artificial administrator 150.25 and the task scheduler 150.22 are denoted by signal flow line 625.

There are some domain-wide developments or trends which cannot be seen at the local level of a given file server 110–140, but can be seen or projected by analyzing the domain-wide collective of information that is present in the infrastructure snapshots 150.11 and in the domain-wide virtual catalog snapshots, 150.00, 150.01, 150.02, etc. The artificial administrator 150.25 inspects these domain-wide collectives of information, as indicated by signal flow lines 626 and 627, and takes or schedules responsive actions as deemed necessary. The same information base is available to a remotely located, human administrator as indicated by signal flow lines 636 and 637.

The domain-wide task scheduler 150.22 is responsible for number of tasks other than scheduling event-driven system recovery. As already mentioned, it performs the following additional scheduling tasks of: (1) scheduling backup operations at each network site, (2) scheduling hierarchical storage migration operations at each site; (3) scheduling domain-wide scans by the DAS 150 for virtual catalog information, for infrastructure information or for other domain-wide information; and (4) scheduling archive operations for files stored at each site. The task scheduler 150.22 is additionally responsible for: (5) scheduling diagnostic operations at each network site; (6) scheduling the transfer of a given file over the network-linking backbone 105 from one location on the domain to another; (7) scheduling system shutdowns to allow for routine or event-driven maintenance and repairs; and after a system shutdown, (8) scheduling system restart operations.

Task scheduling can be ordered as a on a one time event, or periodically as determined by the artificial administrator 150.25, or on a daily basis, or on a weekly basis, or monthly basis or yearly basis, as desired.

The policy-enforcer 150.26 which is included within the domain status/control module 150.2 is used for broadcasting domain-wide policy rules to all or selected ones of the domain/local exchange agents 119–149. The local exchange agents 119–149 then enforce the policies locally. Among the types of policies that may be downloaded into the domain/local exchange agents 119–149 is a backup policy dictating whether file backups should be made on an incremental basis every night (e.g. backup only the files that have changed) and on a full basis every weekend (e.g. backup every file over the weekend); or whether some other backup procedure should be followed (e.g. full backup every other day). A similar domain-wide policy may be dictated with regard to hierarchical storage migration. The HSM policy can dictate a length of time from last access at which migration should begin. Similarly, an archive policy may define various conditions under which files should be archived including length of time from last access and status of file owner (e.g. such as when the owner goes on a sabbatical or terminates employment). Additional policies may be broadcast to dictate the availability to different users of various tools on the network.

A virtual file manager 165.1 is included in the administrative graphical user interface (GUI) 165 for retrieving information from the domain-wide virtual catalog snapshots, 150.00, 150.01, 150.02, etc., and displaying desired views or reports to a human administrator. Signal flow line 636 represents the flow of such information across partition 603 to the virtual file manager 165.1. A return signal flow 646 from the virtual file manager 165.1 to the task scheduler 150.22 places desired file manipulation operations on the task execution list of the scheduler.

Database search and report operations are coordinated through a reports and views generating module 165.6. The expandable tree listing of above TABLE 4 is an example of a view provided by the reports and views generating module 165.6. Search results and reports have to pass through a permissions filter 165.7 before being output to a workstation screen 160*a*. The permissions filter 165.7 is controlled by a security module 165.5 of the administrative GUI 165. Persons who provide the appropriate passwords are given different levels of permission and are thereby allowed to or blocked from accessing various functions of the administrative GUI 165. Keyboard requests 160*b* or other inputs also pass through the permissions filter 165.7 prior to being granted. A help module 165.4 is provided for giving users context sensitive help information.

A remote infrastructure manager 165.3 is included in the administrative GUI 165 for generating infrastructure reconfiguration commands. Like file manipulation commands, these infrastructure reconfiguration commands are returned by signal flow line 647 to the task scheduler 150.22 for logging onto its task execution list.

The above disclosure is to be taken as illustrative of the invention, not as limiting its scope or spirit. Numerous modifications and variations will become apparent to those skilled in the art after studying the above disclosure.

By way of example, in the same manner that each domain administrating server (DAS) collects and integrates the catalog, infrastructure, and other information from the respective sites of its domain, an enterprise-administrating server (EAS) can be fashioned to collect and analyze the corresponding information from all the DAS's of a given enterprise.

Given the above disclosure of general concepts and specific embodiments, the scope of protection sought is to be defined by the claims appended hereto.

What is claimed is:

1. A network system comprising:

(a) a network-linking backbone;

(b) a plurality of file-servers operatively coupled to the backbone for providing file-serving services over the backbone, each file server having a nonvolatile data storage device storing a plurality of data files, the respective data storage device of each file server further having a local catalog stored within said respective data storage device for identifying each file of the respective data storage device by name and storage location; and (c) a domain administrating server (DAS) operatively coupled to the backbone, wherein the DAS has a domain-wide virtual catalog containing copies of the file identifying information currently stored in the local catalogs of said plurality of file-servers, wherein the DAS has oversight means for overseeing and managing domain-wide activities including a transfer of file data from a first of the file servers to a second of the file servers, and wherein the oversight means consults the domain-wide virtual catalog to identify the location of a source file in said first file server from which said to-be-transferred file data is to be obtained.

2. The network system of claim 1 wherein the oversight means consults the domain-wide virtual catalog to identify the name and location within the second file server of a destination directory into which said to-be-transferred file data is to be sent.

3. The network system of claim 1 wherein the DAS includes:

(c.1) historical database means for storing, in addition to the copies of the file identifying information currently stored in the local catalogs which copies define the current domain-wide virtual catalog, copies of previous domain-wide virtual catalogs, said current and previous domain-wide virtual catalogs defining a searchable, historical record of domain-wide virtual catalog snapshots, wherein the historical database means includes searching means for searching the historical record of domain-wide virtual catalog snapshots for files according to one or more primary and secondary search fields selected from the group consisting of:

(c.1a) chronological file attributes, (c.1b) file storage location, (c.1c) file name, and (c.1d) file access attributes.

4. The network system of claim 1 further comprising:

(d) a plurality of workstations operatively coupled to the network-linking backbone, wherein each workstation has a same user interface by which a user can access the domain-wide virtual catalog held in the domain administrating server (DAS).

5. The network system of claim 4 wherein:

the user interface of each workstation includes a tree listing means for displaying at the respective workstation a multi-leveled system tree having at least a Domain item and a Server item as expandable items on respective first and second levels of the multi-leveled system tree;

expansion of the Domain item produces a displayed listing of a plurality of N servers within a pre-designated current domain, each of the N servers being identified by a predefined ServerName displayed in the listing, any one of which servers can be designated as a currently-selected server; and expansion of the Server item produces a displayed listing of a plurality of M volumes within a pre-designated current server, each of the M volumes being identified by a predefined VolumeName displayed in the listing, any one of which volumes can be designated as a currently-selected volume.

6. The network system of claim 5 wherein:

expansion of the Domain item further produces in the displayed listing of said plurality of N servers additional information regarding the location and status of each server;

said domain administrating server (DAS) includes a searchable DAS database containing said domain-wide virtual catalog and further containing said information regarding the location of each server; and the information in said displayed listing is obtained from said DAS database.

7. The network system of claim 6 wherein:

the tree listing means generates said multi-leveled system tree to further have a Volume item and a Directory item as expandable items on respective third and fourth levels of the multi-leveled system tree;

expansion of the Volume item produces a displayed listing of a plurality of K directories within a pre-designated currently-selected volume, each of the K directories being identified by a predefined DirectoryName displayed in the listing, any one of which directories can be designated as a currently-selected directory; and expansion of the Directory item produces a displayed listing of a plurality of J files within a pre-designated currently-selected directory, each of the J files being identified by a predefined FileName displayed in the listing, any one of which files can be designated as a currently-selected file.

8. The network system of claim 7 wherein:

the user interface of each workstation includes a file manipulating means for moving or otherwise manipulating a file designated as a currently-selected file by said tree listing means;

the domain administrating server (DAS) includes a task scheduler for scheduling domain-wide data transfers; and the file manipulating means of each workstation submits file transfer requests to the task scheduler in order to carry out a user-defined file transfer.

9. A network system comprising:

(a) a network-linking backbone;

(b) a plurality of file-servers operatively coupled to the backbone for providing file-serving services over the backbone, wherein each file server has a nonvolatile data storage device for storing and retrieving a plurality of data files, wherein each file server further has an operations supporting infrastructure for supporting file storage and retrieval operations of the file server, wherein each file server additionally has a local infrastructure monitoring and reporting agent for monitoring the operations supporting infrastructure of the file server and for issuing an alert report onto the network-linking backbone in the event that a problem develops in the corresponding operations supporting infrastructure; and (c) a domain administrating server (DAS) operatively coupled to the backbone, wherein the DAS has a backbone monitoring means for monitoring communications along the network-linking backbone, detecting alert reports issued by any of the infrastructure monitoring and reporting agents, collecting the alert reports and storing the alert reports for immediate or later analysis.

10. The network system of claim 9 wherein:

the backbone monitoring means includes means for detecting alert reports that are predefined as needing immediate response and for flagging such reports as immediate-response reports; and the DAS has immediate alert forwarding means for forwarding immediate-response reports to either a communications device of human administrator or to a rule-base driven artificial administrator.

11. A network system according to claim 9 wherein said operations supporting infrastructure of each file-server includes power supply means for supplying operational power to the local data storage device of the respective file-server.

12. A network system according to claim 9 wherein said operations supporting infrastructure of each file-server includes local temperature control means for controlling the temperature of the respective file-server.

13. A network system according to claim 9 wherein said operations supporting infrastructure of each file-server includes local component security means for assuring physical security of one or more local components within the respective file-server.

14. A network system according to claim 9 wherein said operations supporting infrastructure of each file-server includes local data path integrity checking means for assuring proper interconnections between two or more local components within the respective file-server.

15. A centralized file management system for managing files stored in plural data storage devices of a network domain, wherein the plural data storage devices of the domain are interconnected by a domain-linking backbone and the files of said data storage devices are accessed by way of the domain-linking backbone, wherein each storage device stores a local catalog that identifies a name, location and/or other attributes of each local file and/or directory contained within the respective storage device, said system comprising:

(a) scan means, coupled to domain-linking backbone, for periodically scanning the network domain and interrogating the local catalog of each data storage device in the network domain.

16. The file management system of claim 15 further comprising:

task scheduler means, operatively coupled to the network-linking backbone, for detecting traffic patterns on the backbone and scheduling the timing of data transfer operations that use the network-linking backbone so as to minimize traffic congestion;

wherein the scan means is responsive to the task scheduler means and performs said scanning of the network domain during time periods which would otherwise have substantially minimal traffic congestion.

17. The file management system of claim 15 wherein the scan means takes periodic snapshots of the network domain and the catalog integrating means responsively integrates the periodically collected file identifying information so as to form a historical plurality of domain-wide virtual catalog snapshots.

18. A centralized file management method for managing files stored in plural data storage devices of a network domain, wherein the plural data storage devices of the domain are interconnected by a domain-linking backbone and each storage device stores a local catalog that identifies a name, location and/or other attributes of each local file and/or directory contained therein, said method comprising the steps of:

(a) interrogating the local catalog of each data storage device in the network domain for file identifying information stored within said local catalog; and (b) integrating the file identifying information collected by said interrogating step from each local catalog into a domain-wide virtual catalog so that each file of the network domain can be identified by name, location or another attribute by consulting the domain-wide virtual catalog.

19. A file access method comprising the steps of:

(a) interrogating a local catalog of each data storage device in a network composed of plural data storage devices linked to one another by a network-linking backbone;

(b) retrieving from each interrogated local catalog, file identifying information identifying a name, a storage location and/or other attributes of each file stored in the interrogated device; and (c) integrating the retrieved file identifying information collected from each local catalog into a domain-wide virtual catalog so that each file stored on the network can be identified by name, location and/or another attribute by consulting the domain-wide virtual catalog.

20. A network system comprising:

(a) a network-linking backbone;

(b) a plurality of file-servers operatively coupled to the backbone for providing file-serving services over the backbone, each file server having a data storage device for storing a plurality of data files, the respective data storage device of each file server further having a local catalog for identifying each file currently-stored in the respective data storage device by name and storage location; and (c) a domain administrating server (DAS) operatively coupled to the backbone, wherein the DAS has a first virtual catalog containing copies of the file identifying information currently stored in the local catalogs of said plurality of file-servers.

21. A network system according to claim 20 wherein the DAS further includes a second virtual catalog containing copies of file identifying information previously stored in the local catalogs of said plurality of file-servers at a first time substantially earlier than that of the currently-stored files.

22. A network system according to claim 21 wherein the DAS further includes a third virtual catalog containing copies of file identifying information previously stored in the local catalogs of said plurality of file-servers at a second time substantially earlier than that of the currently-stored files.

23. A network system according to claim 22 wherein the first through third virtual catalogs define a relational database and wherein the DAS further includes historical database means for searching through the first through third virtual catalogs in accordance with a supplied relational query.

* * * * *